United States Patent
Hung et al.

(10) Patent No.: US 9,339,081 B2
(45) Date of Patent: May 17, 2016

(54) SHOCK ABSORBING STRUCTURE FOR THE HEEL OF HIGH-HEELED FOOTWEAR

(71) Applicants: Sheng Chung Hung, Taipei (TW); Ming Ta Chang, Taipei (TW)

(72) Inventors: Sheng Chung Hung, Taipei (TW); Ming Ta Chang, Taipei (TW)

( * ) Notice: Subject to any disclaimer, the term of this patent is extended or adjusted under 35 U.S.C. 154(b) by 521 days.

(21) Appl. No.: 13/893,331

(22) Filed: May 13, 2013

(65) Prior Publication Data

US 2013/0318836 A1 Dec. 5, 2013

(30) Foreign Application Priority Data

May 29, 2012 (TW) .............................. 101210185 U

(51) Int. Cl.
*A43B 13/18* (2006.01)
*A43B 21/28* (2006.01)
*F16F 13/00* (2006.01)

(52) U.S. Cl.
CPC ............... *A43B 21/28* (2013.01); *F16F 13/005* (2013.01); *F16F 13/007* (2013.01)

(58) Field of Classification Search
CPC ..... A43B 21/265; A43B 21/28; A43B 21/285
USPC .................................................... 36/35 B, 39
See application file for complete search history.

(56) References Cited

U.S. PATENT DOCUMENTS

| | | | | |
|---|---|---|---|---|
| 62,783 A | * | 3/1867 | Snow | A43B 21/433 36/39 |
| RE9,035 E | * | 1/1880 | Hunter | 36/39 |
| 530,760 A | * | 12/1894 | Fowler | A43B 21/433 36/39 |
| 960,708 A | * | 6/1910 | Rottger | A43B 21/433 36/39 |
| 1,005,585 A | * | 10/1911 | Vogt | A43B 21/28 36/35 B |
| 1,295,892 A | * | 3/1919 | Hand | A43B 21/433 36/39 |
| 1,407,506 A | * | 2/1922 | Winter | A43B 21/06 36/35 B |
| 1,566,350 A | * | 12/1925 | Smith | A43B 21/38 36/39 |
| 1,584,983 A | * | 5/1926 | Eichorn | A43B 21/433 36/39 |
| 1,667,939 A | * | 5/1928 | Levy | A43B 21/30 36/35 B |
| 1,771,793 A | * | 7/1930 | Kind | A43B 21/28 36/35 B |
| 2,486,704 A | * | 11/1949 | Cameron | A43B 21/437 36/36 R |
| 2,535,102 A | * | 12/1950 | Taylor | A43B 21/30 36/38 |
| 2,669,037 A | * | 2/1954 | Gilowitz | A43B 21/433 36/36 R |
| 3,181,254 A | * | 5/1965 | Cowen | A43B 21/433 36/39 |

* cited by examiner

*Primary Examiner* — Ted Kavanaugh

(57) ABSTRACT

A shoe heel shock absorber comprising a lower pedestal with a penetrating hole that penetrates through from a top surface to a bottom surface of the lower pedestal; a step edge is formed on an inner surface of the penetrating hole in the top surface of the lower pedestal; an air-cushion is fixed on the to surface of the lower pedestal, which comprises a straight hole and several second positioning holes which are through the air-cushion, and the second positioning holes correspond to the first positioning holes.

7 Claims, 7 Drawing Sheets

SHOCK ABSORBING STRUCTURE FOR THE HEEL OF HIGH-HEELED FOOTWEAR

FIELD OF THE INVENTION

The Present Invention relates to a shock absorbing structure, especially to a shock absorbing structure for the heel of high-heeled footwear.

BACKGROUND OF THE INVENTION

Average females often wore high heels to accommodate their clothes in formal occasions by using the structure of the high heels to make their feet appear to be standing on tiptoe, which would not only make the wearer appear taller, but also make the instep appear to be in a straight line with the lower leg, making the leg line appear longer and the body appearance slender. However, wearing high heels for too long may cause foot pain. To make the wearer be comfortable, a shoe pad is usually placed in the high heel's interior or an elastic buffering part placed under the shoe pad. Yet said shoe pad or elastic buffering part would bounce up and down due to the irregular gravity from the wearer when walking, thus affecting the Heel's stability and cause spraining problems.

As aforementioned disadvantages of prior art, to develop a more ideal and practical structure to satisfy the demand of the consumers has become the main goal and direction for the related manufacturers to research and resolve.

By many years of experience in the designing, manufacturing and development of the related products, the applicant has invented a shock absorbing structure for the heel of high-heeled footwear to overcome aforementioned disadvantages.

SUMMARY OF THE INVENTION

Present invention provides a shock absorbing structure for the heel of high-heeled footwear, which comprises:

A Lower Pedestal with a Penetrating Hole that penetrates through the Lower Pedestal's top surface to bottom surface. A Step Edge is formed on the inner surface of said Penetrating Hole in the end close to the top surface of said Lower Pedestal. The top surface of said Lower Pedestal comprises several concaved First Positioning Holes.

An Air-Cushion is fixed on the top surface of said Lower Pedestal, which comprises a Straight Hole and several Second Positioning Holes which are through said Air-Cushion. Said Straight Hole corresponds to said penetrating hole, and said Second Positioning Holes correspond to the First Positioning Holes.

An Upper Pedestal is disposed on the top of said Air-Cushion which comprises a Fixing Column and several Positioning Columns, said Fixing Column is penetrating through said Straight Hole, said Positioning Columns are penetrating through said Second Positioning Holes and inserted in said First Positioning Holes.

A Fixing Element is sheathed by an Elastic Element which is disposed on said Step Edge, said Fixing Element is screw fixed on said Fixing Column. One end of said Elastic Element is against said Step Edge, and another end is against the upper part of said Fixing Column.

One Arc Edge is extended from the edge of the bottom surface of said Upper Pedestal, and another Arc Edge is extended from the edge of the top surface of said Lower Pedestal, which both are curved toward said Air-Cushion, thus, when said Upper Pedestal is pressed, the shape of said Air-Cushion is also shifted and seamlessly against said Arc Edges of said Upper and Lower Pedestal.

Said Fixing Element is sleeved by a Spacer which is between said Fixing Element and said Lower Pedestal, to prevent said Fixing Element direct contacting with said Lower Pedestal which causes the wearing of said Lower Pedestal.

Several Soft Pads are disposed in each of said First Positioning Holes, between said First Positioning Hole and said Positioning Column, to achieve the effects of buffering and noise reduction.

Said Air-Cushion's interior is filled with air.

Said Elastic Element is a spring.

The bottom surface of said Lower Pedestal is locked with a heel tip.

Comparing with prior arts, the advantage of present invention includes: the Soft pad has the effects of buffering and noise reduction, and, by the design that the spring sheathing the Fixing Column and the Air-Cushion suits with the Upper and Lower Pedestal, the effects of Buffering and Shock Preventing are reinforced to absorb and separate the pedaling stress, and reduce the maxima impact force working on the heel, to prevent the central nervous from being affected by the pressure pressed on the heel, also reducing the pain caused by walking in high heels. Furthermore, with the two Arc Edges fit tightly with the Air-Cushion, the effects of Shock Absorbing and Beauty on appearance are improved and the comfort of wearing the high heels is also increased.

The outer heels applied with the present invention are capable of pressure buffering with good stability, hence, can improve the spraining problems caused by unstable shoe pads or elastic buffering parts of conventional high heels.

The implementing techniques and characteristics of present invention are described by following embodiments and drawings appeared below, which is for the people who relates to the field to understand and practice.

DETAILED DESCRIPTION OF PREFERRED EMBODIMENT

Figure 1:
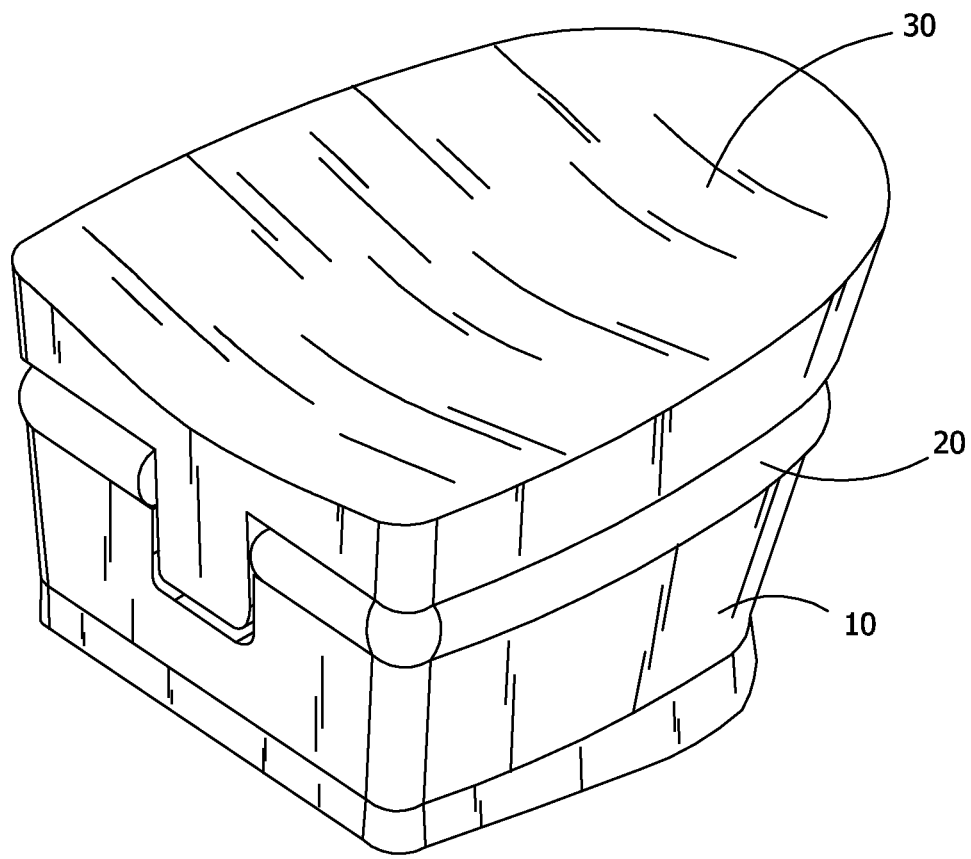
FIG. 1: A Three-dimensional view of the present invention.
Figure 2:
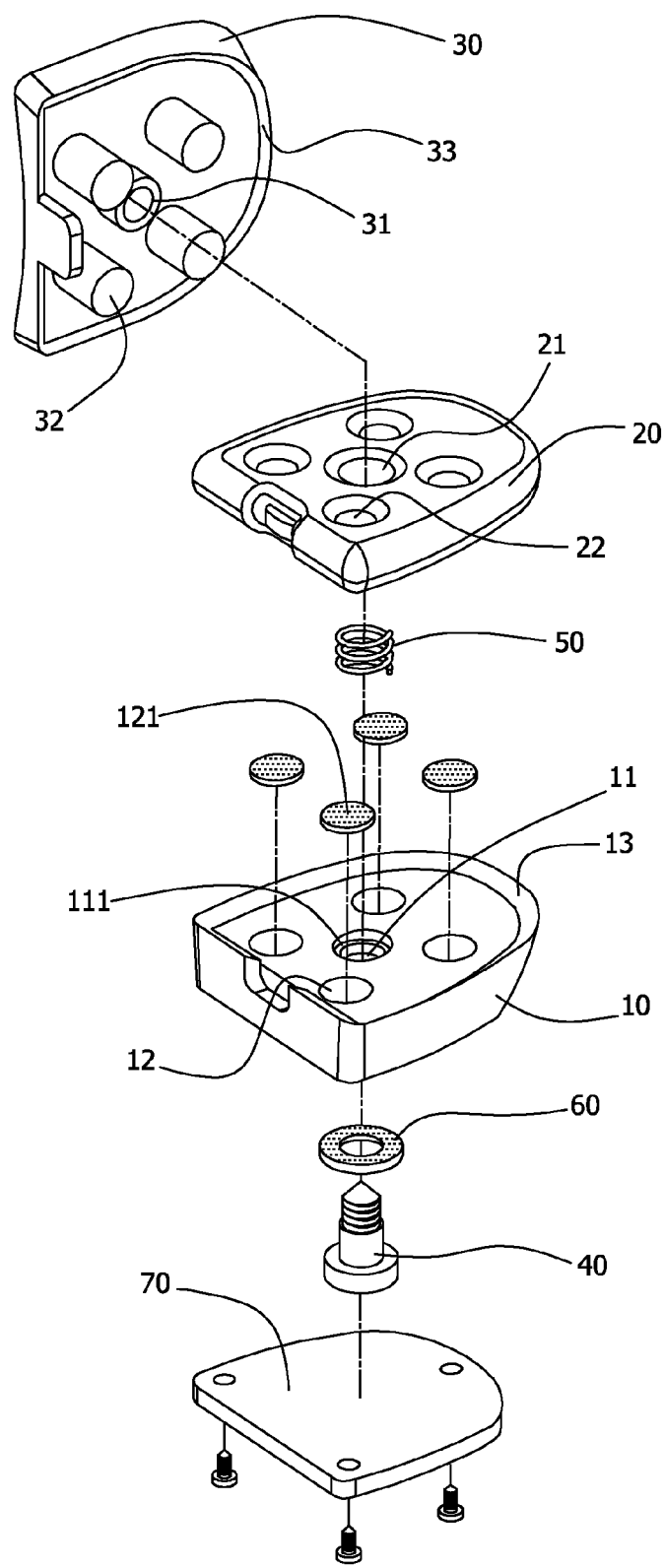
FIG. 2: An Exploded view of the present invention.
Figure 3:
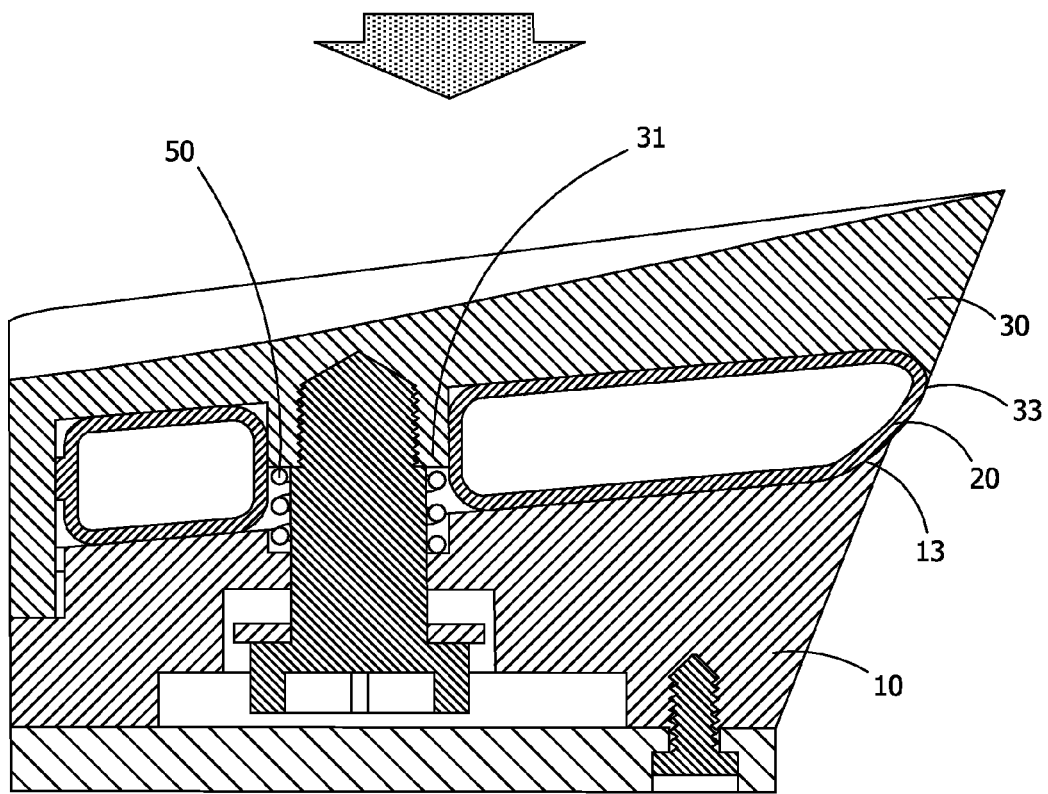
FIG. 3: A cross section view of the present invention which shows the change of structure when the heel is pressed.
Figure 4:
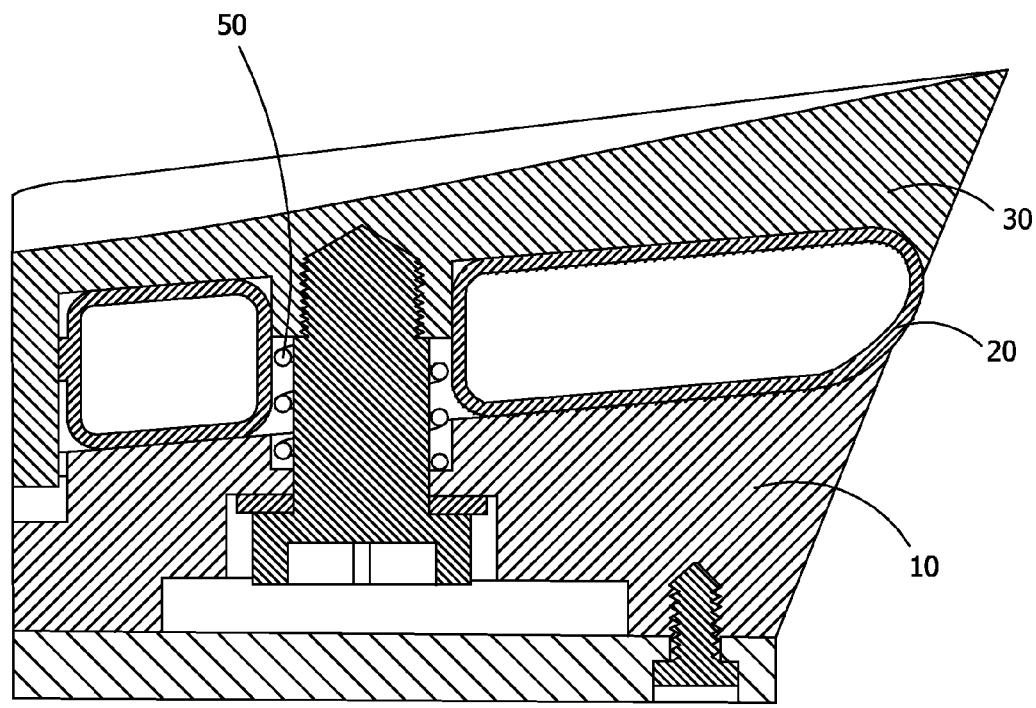
FIG. 4: A cross section view of the present invention.
Figure 5:
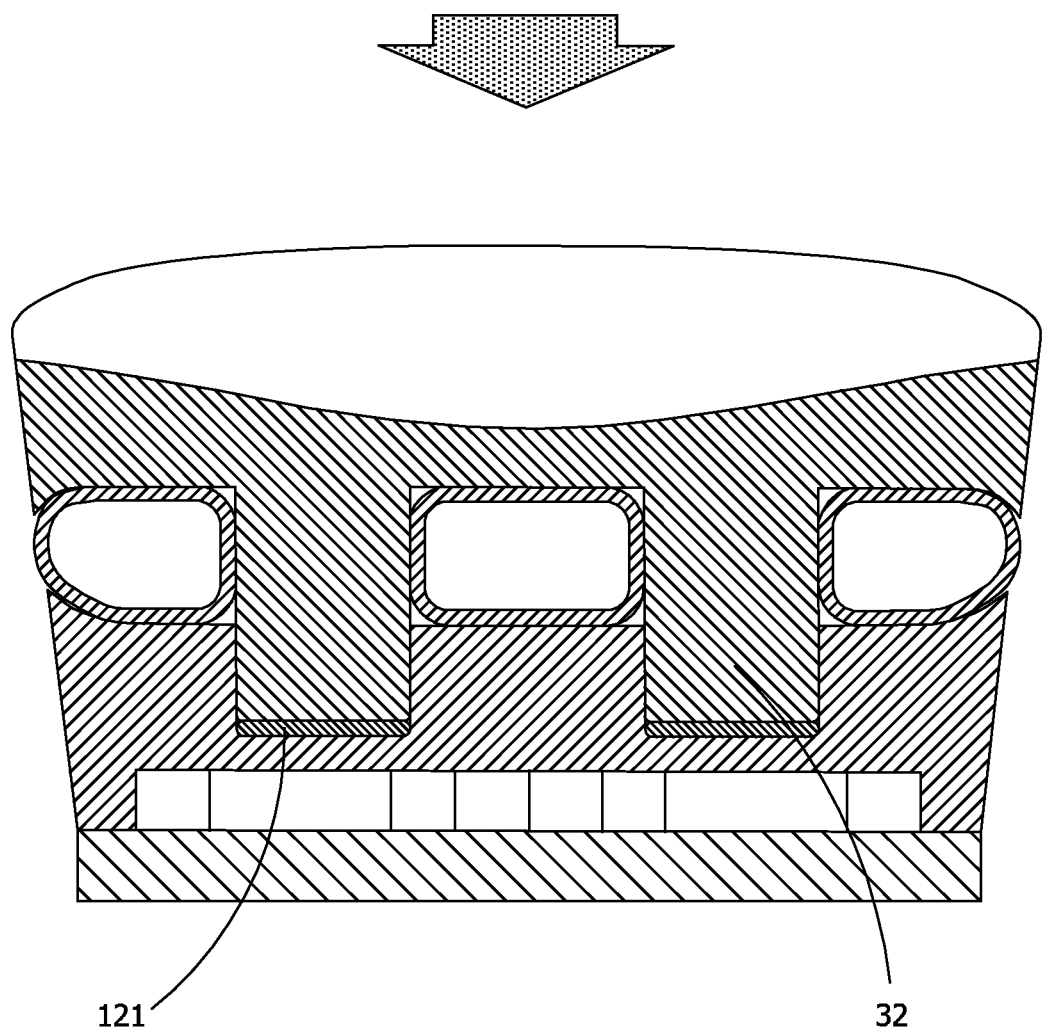
FIG. 5: A cross section view from another angle of the present invention.

As shown in FIGS. 1~7, the present invention provides a Structure of a Shoe Heel Shock Absorber, which includes:

A Lower Pedestal (10) with a Penetrating Hole (11) that penetrates through the Lower Pedestal (10)'s top surface to bottom surface. The bottom surface of said Lower Pedestal is locked with a heel tip (70). A Step Edge (111) is formed on the inner surface of said Penetrating Hole (11) in the end close to the top surface of said Lower Pedestal (10), the top surface of said Lower Pedestal (10) comprises several concaved First Positioning Holes (12).

An Air-Cushion (20) which the interior is filled with air is fixed on the top surface of said Lower Pedestal (10), said Air-Cushion (20) comprises a Straight Hole (21) and several Second Positioning Holes (22) which are through said Air-Cushion (20). Said Straight Hole (21) corresponds to said Penetrating Hole (11), and said Second Positioning Holes

(21) correspond to the First Positioning Holes (12). The air filled in said An Air-Cushion (20) could be nitrogen.

An Upper Pedestal (30) is disposed on the top of said Air-Cushion (20) which comprises a Fixing Column (31) and several Positioning Columns (32), said Fixing Column (31) is penetrating through said Straight Hole (21), said Positioning Columns (32) are penetrating through said Second Positioning Holes (22) and inserted in said First Positioning Holes (12) to position and secure said Air-Cushion (20).

Several Soft Pads (121) are disposed in each of said First Positioning Holes, between said First Positioning Hole (12) and said Positioning Column (32) to keep said Positioning Columns (32) from contacting with said First Positioning Holes (12), thus, the noise due to the direct contact between said First Positioning Hole (12) and said Positioning Column (32) would not be occurred, also achieve the effects of buffering.

A Fixing Element (40) is sheathed by an Elastic Element (50) which is disposed on said Step Edge (111), said Fixing Element (40) is through the Penetrating Hole (11) on said Lower Pedestal (10) and screw fixed on said Fixing Column (31). One end of said Elastic Element (50) is against said Step Edge (111), and another end is against the upper part of said Fixing Column (31). Said Fixing Element (40) is sleeved by a Spacer (60) which is between said Fixing Element (40) and said Lower Pedestal, to prevent said Fixing Element (40) directly contacting with said Lower Pedestal (10) which causes the wearing of said Lower Pedestal (40). Said Elastic Element is a spring.

A First Arc Edge (33) is extended from the edge of the bottom surface of said Upper Pedestal (30), and A Second Arc Edge (13) is extended from the edge of the top surface of said Lower Pedestal (10), which both are curved toward said Air-Cushion (20), thus, when said Upper Pedestal (30) is pressed, the shape of said Air-Cushion (20) is also shifted and seamlessly against said First Arc Edge (33) and Second Arc Edge (13), thus, better shock absorbing effect is achieved.

When the user's rear heel is stepping on said Upper Pedestal (30), the bottom surface of said Upper Pedestal (30) is squeezing said Air-Cushion (20), until said Positioning Columns (32) express the pressure to the pads (121), and said Fixing Column (31) start pressing said Elastic Element (50), said pads (121), Air-Cushion (20) and Elastic Element (50) all are capable of buffering and shock absorbing, when user is raising the foot, the recovering force of said Air-Cushion (20) and Elastic Element (50) would push said Upper Pedestal (30) back to the original position to absorb the reaction force generated from stepping and reduce the maxima impact force to the rear heel of the user, thus, the rear heel of the user is protected from heavy impact force from stepping which may affect the central nerves, and also relief the illness of user's foot caused by long, time walking or standing with high-heeled footwear. The buffering effect could be occurred on the heel of footwear with stability by the application of present invention, thus the heel spraining is prevented, which improves the disadvantages of prior art.

Figure 6:
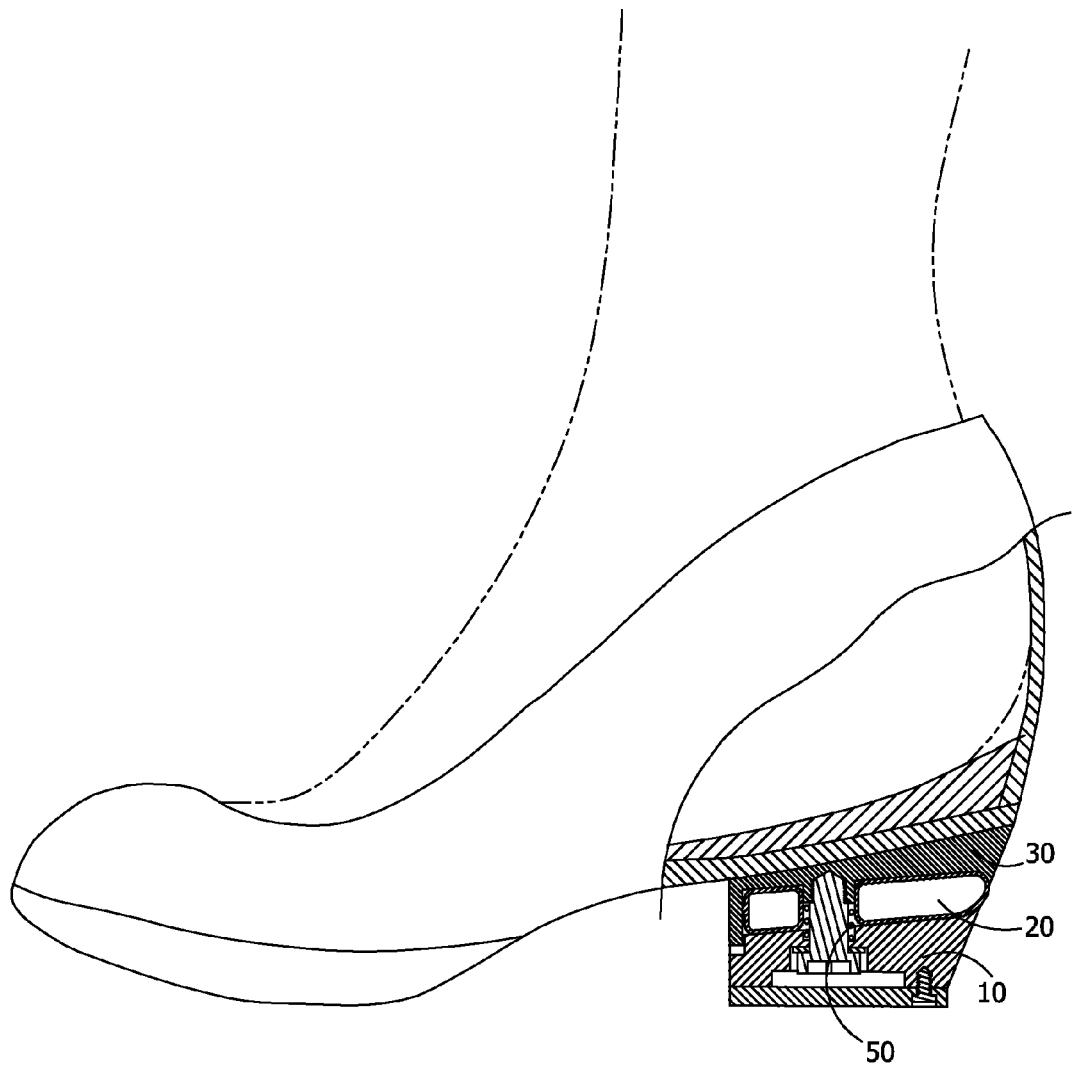
FIG. 6: A scheme of implementing of the present invention.
Figure 7:
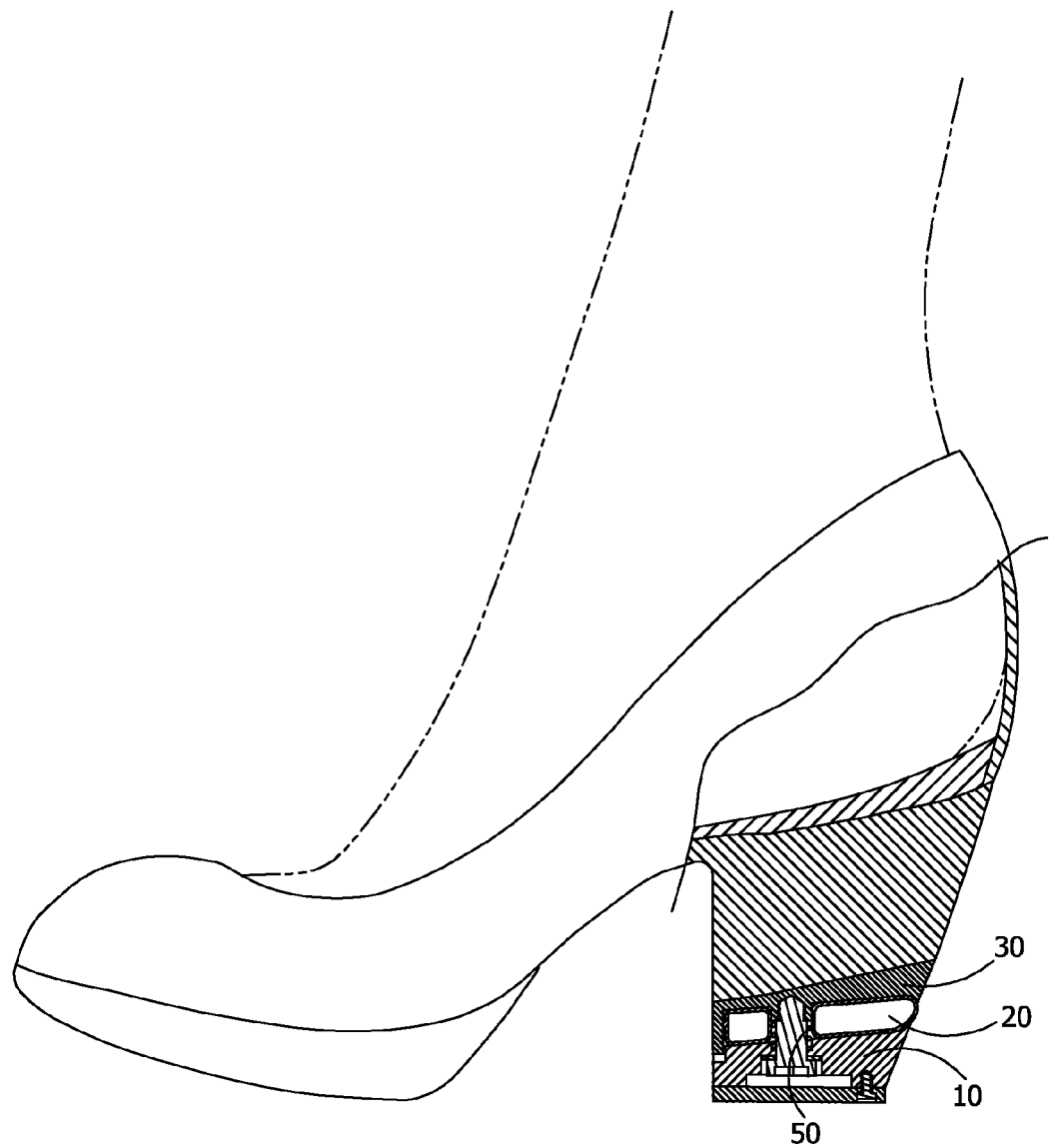
FIG. 7: A scheme of implementing of the present invention on solid heel.

Furthermore, said Lower Pedestal (10) Air-Cushion (20) and Upper Pedestal (30) could be the heel part of high-heel footwear (as shown in FIG. 6) or disposed under the heel of high-heel footwear (as shown in FIG. 7), both could achieve the effect of buffering and shock absorbing.

All descriptions above are only referred embodiment but not limitations of the present invention, the variations and modifications made from the scope of the present invention by people who is skillful in the field may comprise the characteristics as claimed hereafter.

What is claimed is:

1. A shoe heel shock absorber for a heel of high-heeled footwear, said shoe heel shock absorber comprising: a lower pedestal with a penetrating hole that penetrates through from a top surface to a bottom surface of said lower pedestal; a step edge is formed on an inner surface of said penetrating hole in the top surface of said lower pedestal, the top surface of said lower pedestal comprises several concaved first positioning holes; an air-cushion is fixed on the top surface of said lower pedestal, which comprises a straight hole and several second positioning holes which are through said air cushion; said straight hole corresponds to said penetrating hole; said second positioning holes correspond to the first positioning holes; an upper pedestal is disposed on the top of said air-cushion which is comprises a fixing column and several positioning columns; said fixing column is penetrating through said straight hole; said positioning columns are penetrating through said second positioning holes and inserted in said first positioning holes; a fixing element is sheathed by an elastic element which is disposed on said step edge; said fixing element extends through the penetrating hole on said lower pedestal and screw fixed to said fixed column of said upper pedestal; one end of said elastic element is against said step edge, and another end is against the upper part of said fixing column.

2. A shoe heel shock absorber according to claim 1, further comprising a first arc shaped edge extended from an edge of a bottom surface of said upper pedestal, and a second arc shaped edge extended from an edge of the top surface of said lower pedestal, with both first and second arc shaped edges curved toward said air-cushion, thus, when said upper pedestal is pressed, the shape of said air-cushion is also shifted and seamlessly against both the first and second arc shaped edges.

3. A shoe heel shock absorber according to claim 1, wherein said fixing element is sleeved by a spacer which is between said fixed element and said lower pedestal.

4. A shoe heel shock absorber according to claim 1, further comprising several soft pads which are disposed in each of said first positioning holes, between said first positioning hole and said positioning column.

5. A shoe heel shock absorber according to claim 1, wherein said air-cushion's interior is filled, with air.

6. A shoe heel shock absorber according to claim 1, wherein said elastic element is a spring.

7. A shoe heel shock absorber according to claim 1, wherein the bottom surface of said lower pedestal is locked with a heel tip.

* * * * *